(12) United States Patent
Weres et al.

(10) Patent No.: US 6,589,405 B2
(45) Date of Patent: Jul. 8, 2003

(54) MULTILAYER OXIDE COATED VALVE METAL ELECTRODE FOR WATER PURIFICATION

(76) Inventors: Oleh Weres, 19 Ravenwood La., Napa, CA (US) 94558; Henry Edward O'Donnell, 280 Underhill Dr., Napa, CA (US) 94558

( * ) Notice: Subject to any disclaimer, the term of this patent is extended or adjusted under 35 U.S.C. 154(b) by 58 days.

(21) Appl. No.: 09/855,293

(22) Filed: May 14, 2001

(65) Prior Publication Data

US 2001/0042682 A1 Nov. 22, 2001

Related U.S. Application Data

(60) Provisional application No. 60/204,147, filed on May 15, 2000.

(51) Int. Cl.[7] ............................................... C25B 11/00
(52) U.S. Cl. .......................... 204/290.12; 204/290.13; 204/290.14; 204/290.01
(58) Field of Search ........................ 204/290.01, 290.06, 204/290.08, 290.09, 290.12, 290.14, 290.13

(56) References Cited

U.S. PATENT DOCUMENTS

| | | | |
|---|---|---|---|
| 3,835,514 A | 9/1974 | Pollock |
| 3,878,083 A | 4/1975 | DeNora |
| 3,895,960 A | 7/1975 | Brown |
| 4,028,215 A | 6/1977 | Lewis |
| 4,125,449 A | 11/1978 | Lewis |
| 4,208,450 A | 6/1980 | Lewis |
| 4,331,523 A | 5/1982 | Kawasaki |
| 4,444,642 A | 4/1984 | Hinden |
| 4,447,509 A | 5/1984 | Maskalick |
| 4,528,084 A | 7/1985 | Beer |
| 4,680,100 A | 7/1987 | Morin |
| 4,708,888 A | 11/1987 | Mitchell |
| 4,839,007 A | 6/1989 | Kötz |
| 5,041,196 A | 8/1991 | Cawlfield |
| 5,064,514 A | 11/1991 | Cawlfield |
| 5,084,149 A | 1/1992 | Kaczur |
| 5,108,560 A | 4/1992 | Cawlfield |
| 5,158,658 A | 10/1992 | Cawlfield |
| 5,294,319 A | 3/1994 | Kaczur |
| 5,298,280 A | 3/1994 | Kaczur |
| 5,364,508 A | 11/1994 | Weres |
| 5,364,509 A | 11/1994 | Dietrich |
| 5,419,824 A | 5/1995 | Weres |
| 5,439,577 A | 8/1995 | Weres |
| 5,783,050 A | 7/1998 | Coin |

*Primary Examiner*—Bruce F. Bell

(57) ABSTRACT

An electrode with large active surface area is made by winding a Ti-fiber tow around a rectangular Ti-plate, and an electrocatalytic coating of three layers is applied. A precoat comprising a mixture of iridium dioxide and tantalum pentoxide is applied first, using a solution of the corresponding chloride salts in hydrochloric acid with some nitric acid added to inhibit corrosion of the metal. A sealing coat is then applied, comprising tin dioxide doped with antimony, in order to improve adhesion of the final oxide coat to the precoat. The third and final coat comprises particles of titanium dioxide doped with niobium in the +4 oxidation cemented with titanium dioxide that is doped with antimony. Anodes of this description are preferably assembled together with corrosion resistant cathodes in an alternating sequence, with a plastic coated fiber glass mesh placed between the anodes and cathodes to prevent short circuiting. When a sufficiently large voltage is applied across the cell, organic substances dissolved in the electrolyte will be oxidized.

12 Claims, 4 Drawing Sheets

MULTILAYER OXIDE COATED VALVE METAL ELECTRODE FOR WATER PURIFICATION

RELATED PATENT APPLICATIONS

None.

STATEMENT REGARDING FEDERALLY SUPPORTED RESEARCH AND DEVELOPMENT

Development of improvements disclosed herein was partly supported by the Strategic Environmental Research and Development Program of the United States Department of Defense under Contract N00167-98-C-0011.

BACKGROUND OF THE INVENTION

1. Field of Invention

The invention disclosed is an electrode comprising Ti-metal fiber wound on to a Ti-metal plate with an electrocatalytic coating that allows operation at a potential large enough to produce hydroxyl free radicals and oxidize substances dissolved in water or an electrolyte solution, and an electrochemical cell including such electrodes. An improved electrode coating sequence and coating procedure are also provided, providing increased service life and good current yield. Made of different materials, electrodes of this geometry may also be used in other process applications, in a fuel cell or as battery plaques.

BACKGROUND OF THE INVENTION

2. Description of Prior Art

In U.S. Pat. No. 5,419,824 Weres and Hoffmann provided an electrode comprising a titanium metal substrate covered with a thin layer of titanium dioxide doped with about 4 mole percent of niobium in the +4 moxidation state. The single d-electron of the $Nb^{+4}$ ions enters the conduction band of the mixed metal oxide, making the mixed oxide an heavily n-doped semiconductor. In U.S. Pat. No. 5,364,508 Weres and Hoffmann disclosed use of this electrode as an anode to generate hydroxyl free radical by oxidizing water and to oxidize organic substances dissolved in water. In U.S. Pat. No. 5,439,577 Weres and Hoffmann provided a water purification device utilizing the electrodes provided in U.S. Pat. No. 5,419,824 and an electrolytic cell wherein these electrodes are made by applying the doped titanium dioxide layer to titanium sheet, and assembled in a bipolar array.

A detailed electrode coating procedure was provided in U.S. Pat. No. 5,419,824. A "white slurry" coating composition was prepared, comprising hydrous titanium dioxide (the precursor of anatase pigment which has been precipitated from titanium sulfate solution and washed, but not dried or calcined) dispersed in water. The water soluble compounds diammonium bilactatotitanium (commercially available) and ammonium niobate were added in the correct proportions to cement the slurry and provide the desired level of Nb-doping. An "overcoat" solution was also used, comprising an aqueous solution of the same titanium and niobium compounds. The Ti-metal substrate was dipped into the "white slurry" composition, then baked in air at 400° C. to dry and bake on the slurry. About three coats of the white slurry were applied in this way, followed by three layers of "overcoat," which cemented the slurry coat. Finally, the electrodes were annealed at 650–800° C. under hydrogen to reduce the niobium in the coating to the +4 oxidation state, conferring the desired semiconductive properties upon the electrode coating. Adding a bit of water vapor to the hydrogen inhibits hydrogen absorption into the Ti-metal substrate, and small electrodes in the form of disks or rods may be produced in this way. However, annealing plate electrodes under hydrogen warps them severely, and fiber electrodes are embrittled and practically destroyed. Therefore, the utility of the electrode coating method revealed in U.S. Pat. No. 5,419,824 is limited to producing small laboratory test electrodes. Also, electrodes coated in this manner fail after a few days of continuous operation due to passivation of the Ti-metal surface beneath the semiconductive oxide coat, making them useless for practical application. Even with periodic reversals of current, an electrode made of Ti-fiber cannot be operated in bipolar mode, because take-up of hydrogen while cathodically polarized embrittles and eventually destroys the fiber.

In U.S. Pat. No. 3,878,083 De Nora et al. provided a titanium electrode coated with a mixture of iridium dioxide and tantalum pentoxide. In U.S. Pat. No. 4,839,007 Kötz et al. provided a method of purifying industrial waste water using an anode comprising a Ti-metal substrate coated with tin dioxide doped (in the preferred embodiment) with antimony. This coating composition allows the electrode to operate at potential high enough to oxidize organic materials dissolved in water. In U.S. Pat. No. 5,364,509 Dietrich described a titanium anode with a two layer coating. The first coat comprises a mixture of $IrO_2$ and $Ta_2O_5$, and the second coat comprises $SnO_2$ doped with Sb.

In U.S. Pat. Nos. 4,444,642 and 4,528,084 Hinden and Beer teach using a solution of iridium trichloride and HCl in an alcohol solvent to apply a protective precoat, noting that the solution should attack the Ti-metal substrate, producing a thick oxide layer comprising $IrO_2$ and $TiO_2$, intimately mixed. This coating solution is strongly reducing and depassivates the Ti-metal surface, causing it to corrode. In trying to use this solution, we also noted that it spoils rapidly once used, probably because $Ti^{+3}$ produced by corrosion of the Ti-metal reduced the iridium in solution, causing it to precipitate. U.S. Pat. No. 3,878,083 teaches application of a coating comprising $IrO_2$ and $Ta_2O_5$ using a solution of $IrCl_3$ and $TaCl_5$, in hydrochloric acid. This coating solution is very weakly oxidizing. Scanning electron microscopy of Ti-fiber electrodes that we precoated using a solution comprising $H_2IrCl_6$ and $TaCl_5$ in hydrochloric acid (which is more strongly oxidizing and thereby less corrosive against Ti than the solution recommended in U.S. Pat. No. 3,878,083) revealed that some fibers had thick coatings on them, indicating depassivation and corrosion of the Ti-metal substrate, while other fibers had very thin coats. Because the diameter of the fibers is small, corrosion, if it occurs, can dissolve a large fraction of the fiber's mass, and the thick mixed oxide coating produced fills in the grooves typically present in the surface of the fibers, decreasing their effective surface area.

In process electrochemistry, increasing electrode surface area improves the kinetics of the electrochemical process at low reactant concentration. Increased surface area also decreases the true current density at the surface in proportion, allowing the cell to operate at lower voltage and increasing the service life of the electrode. In batteries, increased surface area of the electrode plaques provides improved contact with the active material, improving energy storage efficiency. In practice, large surface area process electrodes and battery plaques are very similar and their design is governed by much the same criteria, allowing technology to be usefully and easily transferred between the two fields.

In U.S. Pat. No. 3,895,960 Brown et al. provided an electrode plaque made by compressing and diffusion bonding iron fibers, attaching a current collector by mechanical means or by welding, and plating the entire assembly with nickel to provide the needed electrocatalytic surface properties. In Brown's Example 1, iron fibers with length:diameter ratio of about 1,900 were used to produce an electrode plaque with 95% porosity, 0.025 inch thickness, and specific area 100 $cm^2/cm^3$. In U.S. Pat. No. 3,835,514 Pollock provided a similar electrode plaque with L:D of 800 to 8000:1, porosity of 70 to 97% and a diffusion bonded bus connector.

In U.S. Pat. No. 4,331,523 Kawasaki described electrodes suitable for water electrolysis comprising a perforate current collector, preferably titanium expanded mesh or titanium perforated plate coated with platinum group metals, with a "fibrous assembly" pressed against it to provide large surface area. He noted that the fibrous assembly could comprise a diffusion bonded "web" of titanium fibers coated with platinum groups metals. (Here and throughout, we use the term "platinum group metals" to mean the metallic elements Ru, Rh, Pd, Os, Ir and Pt and also their oxides.) Kawasaki did not specify L:D, porosity or specific area of the "fibrous assembly" in his electrodes, but his examples suggest values similar to those taught in U.S. Pat. Nos. 3,895,960 and 5,294,319.

In U.S. Pat. No. 4,708,888 Mitchell et al. described an electrode produced by applying an electrocatalytic coating to a fine titanium expanded mesh, then spot welding or metallurgically bonding current distributor members (also coated Ti) to the coated mesh.

In U.S. Pat. No. 5,294,319 Kaczur et al. combined and improved upon the elements of U.S. Pat. No. 3,895,960 and 4,331,523 to provide an electrode comprising a mat of titanium fibers of at least two distinct diameters with length-:diameter greater than 1000:1 coated with platinum group metals and spot welded to a similarly coated titanium plate.

Metallurgically bonded fibrous electrode structures as provided in U.S. Pat. Nos. 3,895,960 and 4,331,523 are poorly suited to our application because a slurry coating composition would not penetrate into the structure of the electrode plaque and coat the fibers uniformly. The same is true of the electrode provided in U.S. Pat. No. 5,294,319 comprising fibers spot welded to a plate. The same problem would preclude reprocessing and recoating spent electrodes. Also, production costs would be high, and the electrodes would be highly susceptible to fouling by particulates in a waste water treatment application.

The electrode provided by Coin et al. in U.S. Pat. No. 5,783,050, comprising multiple layers of Ti-expanded mesh wound on a Ti-plate with an electrocatalytic coating applied to the assembly, appears to solve this problem. However, the surface area of the expanded mesh is not very large, and applying many layers of expanded mesh to provide a large surface area would make the electrode quite thick. The current needs to flow a considerable distance through electrolyte to reach all active surfaces throughout the thick mesh portion of the electrode. Because electrolyte conductivity in a typical waste water treatment application is small, an electrode with this geometry would operate with uneven current distribution, where most of the current is bunched at the outermost layer of the electrode.

The electrode provided by Morin in U.S. Pat. No. 4,680,100 comprises a thick tow of thousands of very fine nonmetallic fibers coated with a thin layer of metal and wound on a nonconductive plastic support member with electrical connectors attached to the ends of the tow using solder. This electrode cannot be made of titanium or another valve metal, because titanium cannot be plated on to a nonmetallic fiber substrate, and titanium fiber tow is not available with the very small diameter and very large fiber count disclosed. If Ti-fiber tow of this geometry were available, coating it by dipping and baking would both embrittle and cement the very fine fibers; in particular, attempting to apply a slurry coating would cover the tow with a crust leaving most of the fibers inside the tow uncoated and practically inaccessible to electrolyte. If a Ti-fiber electrode with semiconductive oxide coating could be made with this geometry, it would be practically inoperable. With the modest electrolyte conductivity typical of most waste water treatment applications, current would not be able to penetrate into the thick tow much below its exposed surface, and most of the fibers in the tow would remain inactive. Also, the resistance of the very fine titanium fibers would be so large that the current would not travel more than a few inches along the length of the tow, causing most of the length of the tow to remain inactive. Conduction perpendicular to the fibers would be small, as the semiconductive coatings relevant to our application exhibit a contact resistance, effectively blocking current from penetrating more than a few fibers in the perpendicular direction. It would be difficult to solder electrical connectors to the ends of the tow, because solder doesn't wet the slurry coat. If a solder bond were achieved, the solder would be wetted by electrolyte and would corrode, contaminating the water being treated with tin and lead.

SUMMARY OF THE INVENTION

While we believe the theoretical explanations set forth herein to be true, we do not wish to be bound by them.

Herein we improve upon the electrodes described in U.S. Pat. No. 5,419,824. A reformulated outermost oxide coating is provided (hereinafter called the "slurry coat") comprising fine particles of $TiO_2$ doped with Nb in the +4 oxidation state cemented with an infilling matrix of Sb-doped $TiO_2$. Additional coating layers applied to the Ti-metal substrate before applying the slurry coat provide a long service life, and favor good current efficiency when the electrode is operated as an anode.

First, a "precoat" comprising $IrO_2$ and $Ta_2O_5$ is applied. The precoat is very stable and electrocatalytic for generation of oxygen at moderate anodic potential. It protects the anode from failure by passivation of the Ti-metal substrate beneath the slurry coat. Any current that reaches the precoat through cracks in the slurry coat is discharged at a relatively low potential by generating oxygen, and the potential of the Ti-metal surface never rises high enough to create an anodic oxide layer thick enough to impede operation of the anode.

A "sealing coat" comprising $SnO_2$ doped with Sb is applied over the precoat. The sealing coat adheres well to the precoat, and the slurry coat adheres well to the sealing coat. The result is a well adherent slurry coat with few cracks that extend through to the precoat. Minimizing the amount of current that leaks from the electrolyte solution directly to the precoat through cracks in the slurry coat minimizes the amount of current that is wasted by generation of oxygen. The sealing coat is itself capable of operation at an anodic potential large enough to oxidize some substances. Thus, leakage of current from the electrolyte through the slurry coat to reach the sealing coat does not depolarize the anode to nearly the same degree as would leakage of current to reach the precoat. Thereby, a large fraction of the anode current actually passes through the outer surface of the slurry coat creating hydroxyl free radical, and the current yield of the anode is good. (Current yield is proportional to Chemical Oxygen Demand removed from the electrolyte, divided by the electric charge passed through the cell. At 100% current yield, passing 1 Coulomb through the cell would remove 0.083 mg of COD.)

Adequate service life and current yield require that most of the surface of the Ti-metal substrate be covered with an moderately thick semiconductive oxide coat, and "slurry coating" is the only practical way to accomplish this. Also, the "slurry coat" is believed to be ceramic-like in its microstructure rather than glass-like, whereby cracks tend not to penetrate the entire thickness of the slurry coat.

Herein we provide an electrode comprising Ti-fiber tow (preferably about 200 fibers, approximately 25 micrometers in diameter) wound around a Ti-metal plate. The electrode is easily manufactured by directly winding the tow on to the plate using a suitable winding machine. The Ti-metal fiber provides large active surface area, but the diameter of the fiber is large enough to allow coating without embrittlement or excessive cementation. Cementation that occurs is easily countered by simple mechanical means; for example, by sonication between layers of precoat and sealing coat, or by lightly rubbing and rolling the tow against the plate to separate the fibers between layers of slurry and overcoat. When the coating fails, poorly adherent material can be removed by sonication and the plates can be recoated. Because the fibers are not in any way fused together, good permeability is retained.

Anodes of this description are most conveniently stacked in alternation with flat plate cathodes, separating anodes and cathodes using a plastic coated fiberglass screen to prevent short circuiting. Compressing the stack presses the fibers against the Ti-plate providing good electrical contact along the entire length of the tow, and producing a thin reaction zone which favors even distribution of current over the surface of all fibers. Forcing flow perpendicular to the length of the tow provides good contact of the electrolyte with the coated fiber, and purges gas bubbles from between the fibers. This electrode and electrolytic cell are well suited for the purification of waste waters by oxidation of organic compounds dissolved in the water.

Alternatively, electrical contact can be provided by securing the fibers to the edges of the plate by slipping a small extruded plastic channel over the edge of the electrode. This arrangement is useful when operating in more concentrated electrolyte with a physical gap present between adjacent electrodes.

LIST OF DRAWING FIGURES

FIG. 1 shows the multiple coating layers applied to the surface of the Ti-metal substrate, which together comprise the electrocatalytic coating of the electrode.

FIG. 2 shows the physical structure of the electrode.

FIG. 3 illustrates the method used to wind the Ti-fiber on to the Ti-metal plate.

FIG. 4 shows in vertical cross-section an electrochemical cell that includes several anodes of the kind illustrated in FIG. 2.

FIG. 5 is a horizontal cross-section of the cell assembly.

FIG. 6 shows a stack of electrodes bolted together between two end plates in preparation for coating.

DESCRIPTION OF THE DRAWINGS

The electrode consists of a titanium metal substrate with a multilayer metal oxide coating applied to at least part of its surface. The structure of the multilayer electrocatalytic coating, which is only a few micrometers thick, is schematically depicted in FIG. 1. The substrate 10 is titanium metal. The "precoat" 12 is applied to the surface of the substrate, producing a thin layer substantially comprising a mixture of $IrO_2$ and $Ta_2O_5$ which might also contain some $TiO_2$ and iridium metal. Other precoat compositions containing iridium or another Pt group metal may be used; for example, a mixture of $IrO_2$ and $TiO_2$ or a mixture of $TiO_2$ and Pt. A "sealing coat" 14 is applied over the precoat, preferably comprising $SnO_2$ doped with Sb. The sealing coat acts as a primer that provides much improved adhesion of the "slurry coat," shielding the precoat from contact with the electrolyte. The "slurry coat" 16 is the thickest of the layers coating the anode. Preferably, it comprises fine particles of $TiO_2$ doped with Nb in the +4 oxidation state which renders the $TiO_2$ conductive, and said particles are cemented with a matrix of $TiO_2$ doped with Sb. The "overcoat" 18 is applied over the slurry coat to further cement and seal the slurry coat. The overcoat comprises $TiO_2$ doped with Sb or with Nb in the +4 oxidation state. The overcoat soaks into the slurry coat and cements it, become part of the slurry coat; for this reason, slurry coat 16 and overcoat 18 are depicted as overlapping in FIG. 1. For clarity.

Figure 1:
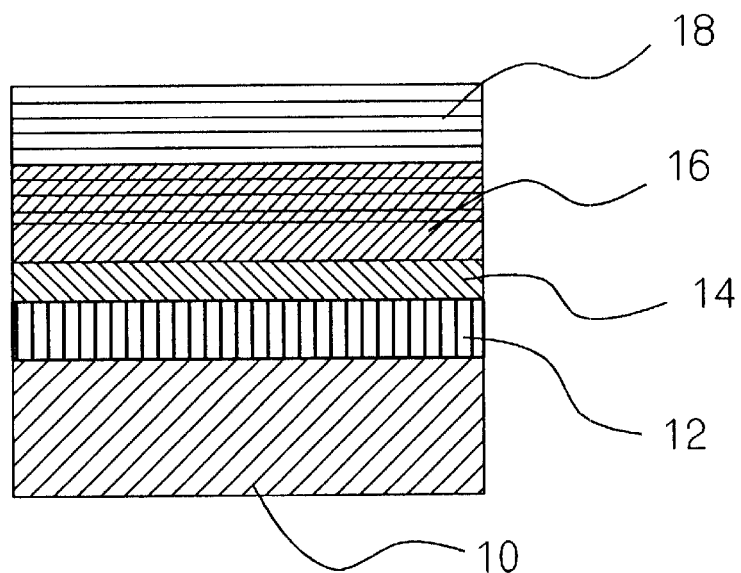
FIG. 1 depicts the structure produced by a single slurry coating cycle, typically comprising three applications of slurry followed by one application of overcoat. More typically, two or three coating cycles are applied.
Figure 2:
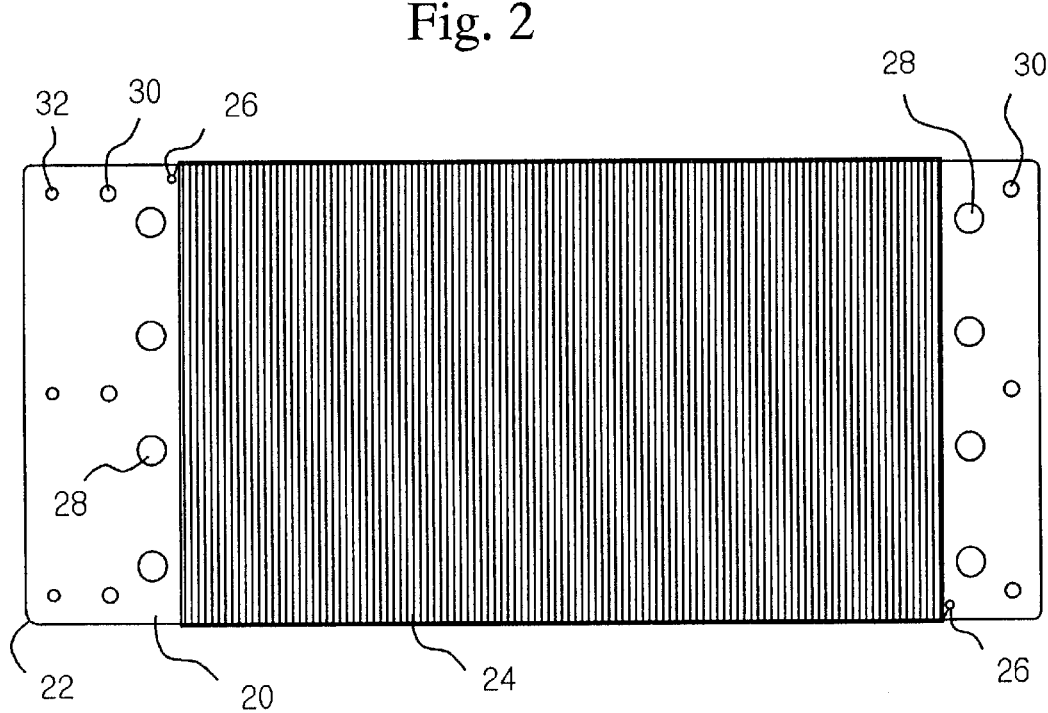

The physical structure of the electrode is depicted in FIG. 2. Electrode plate 20 is a rectangle of Ti-sheet. The edges of the plate are smoothed to prevent damage to the fiber, the corners are slightly rounded for safe handling, and one corner is rounded with a distinctly larger radius 22, allowing it to be used as an index for orienting the plates consistently during the coating process. Many turns of Ti-fiber tow 24 are wound around anode plate 20. The ends of Ti-fiber tow 24 are tied to anode plate 20 using tie holes 26. Flow holes 28 provide water flow paths perpendicular to the plane of the anode when the anode is installed in the cell illustrated in FIGS. 4 and 5. Assembly bolt holes 30 allow passage of the bolts that are used to assemble the cell. Current collector bolt holes 32 allow the copper bus bars that serve as current collectors to be bolted to the edge of the anodes.

Figure 3:
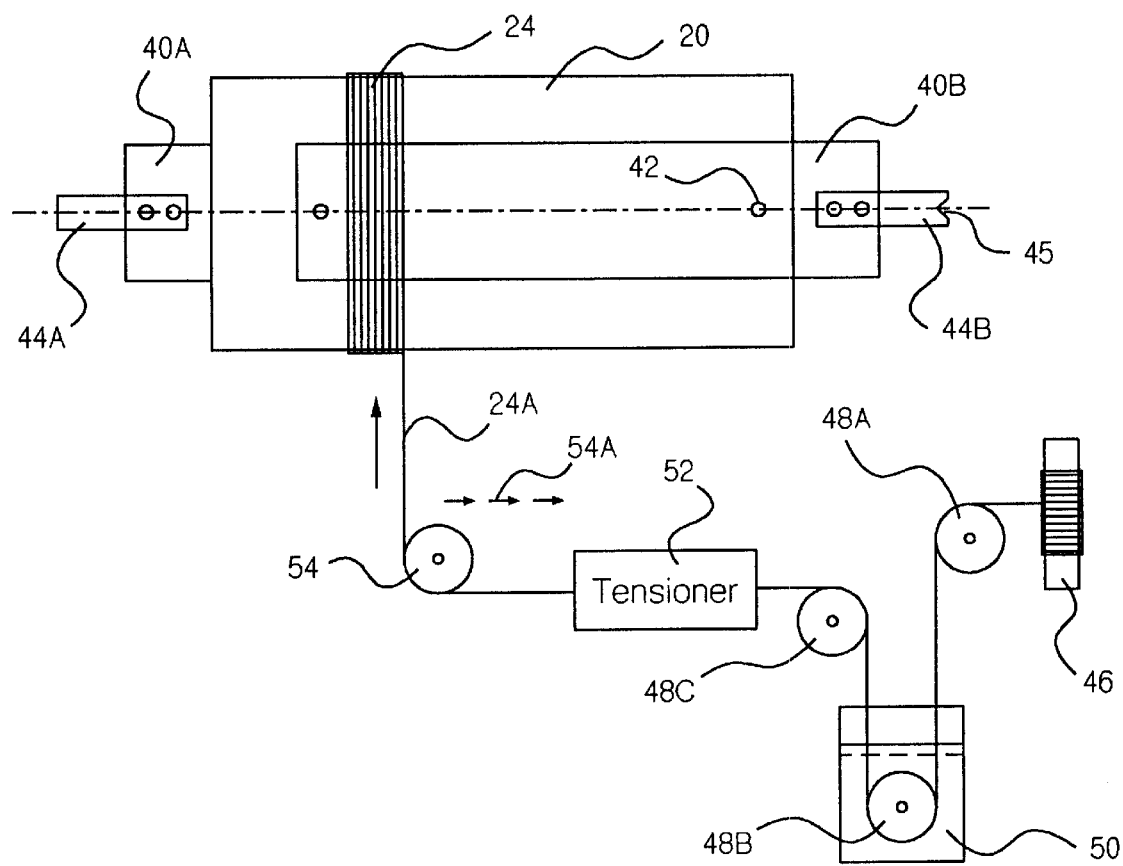

The method of winding the Ti-fiber tow on to the Ti-plate is illustrated in FIG. 3. A winding machine is conveniently made by modifying a metal-working lathe. The cross-feed platform is removed together with the tool holder assembly. A bracket is attached to the carriage and guide pulley 54 is mounted on it. The tensioner assembly 52 is attached to the lathe at the tail end. Tensioner assembly 52 preferably is the kind used in magnet winding machines. Anode plate 20 is bolted between two mounting plates 40A and 40B using machine screws 42 together with the appropriate washers and bolts. Machine screws 42 pass through assembly bolt holes 30 in the anode plates. Spindle pieces 44A and 44B are made of pieces of round aluminum rod machined half-round at one end only, allowing them to be bolted to mounting plates 40A and 40B. The other end of each spindle piece is round. Spindle piece 44A is clamped in the chuck of the lathe. Spindle piece 44B has a conical depression 45 machined into its cylindrical end. The point of the tail stock center is pushed against cylindrical depression 45 by adjusting the ram, thereby securely mounting the plate assembly on the lathe in a manner that allows it to be rotated. Mounting plates 40A and 40B and spindle pieces 44A and 44B are conveniently made of aluminum.

The lathe is geared to provide the pitch desired and set to operate at a low speed. As the lathe rotates the plate assembly (that is, the entire bolted assembly comprising electrode plate 20, mounting plates 40A and 40B and spindle pieces 44A and 44B), the lathe carriage moves feed pulley 54 smoothly along the length of the electrode plate, and Ti-fiber tow 24A is evenly wound on to electrode plate 20 with the desired pitch. The rotation of electrode plate 20 pulls Ti-fiber tow 24A through the system. The Ti-fiber tow comes off spool 46, and passes over directing pulleys 48A, 48B and 48C which take it through a container of water 50. Tensioner 52 controls and evens out the tension of the tow. The water in container 50 contains a small amount of a nonionic wetting agent. Wetting the Ti-fiber tow eliminates the possibility of fire caused by friction or static electricity, and decreases frizzing and pilling. The lathe is provided with a motor power cut-off relay and two reed switches located so that the edge of the carriage will press against one of them when feed pulley 54 has reached the end of the interval to be wound, shutting off the motor. After the lathe stops the ram is backed off and the chuck loosened to release the plate assembly. Machine screws 42 are removed, mounting plates 40A and 40B are pulled-out from between electrode plate 20 and Ti-fiber tow 24 wound on to it. Then another electrode plate is bolted into place and the entire plate assembly is mounted on the lathe. The lead screw direction control lever is adjusted to reverse the direction of carriage travel, and the lathe is turned on to wind the second electrode plate with the opposite pitch and direction of motion. Before turning on the lathe, the plate assembly should be rotated so that the tow is coming off guide pulley 54 is approximately parallel with the plane of electrode plate 20, to avoid breaking the tow.

Figure 4:
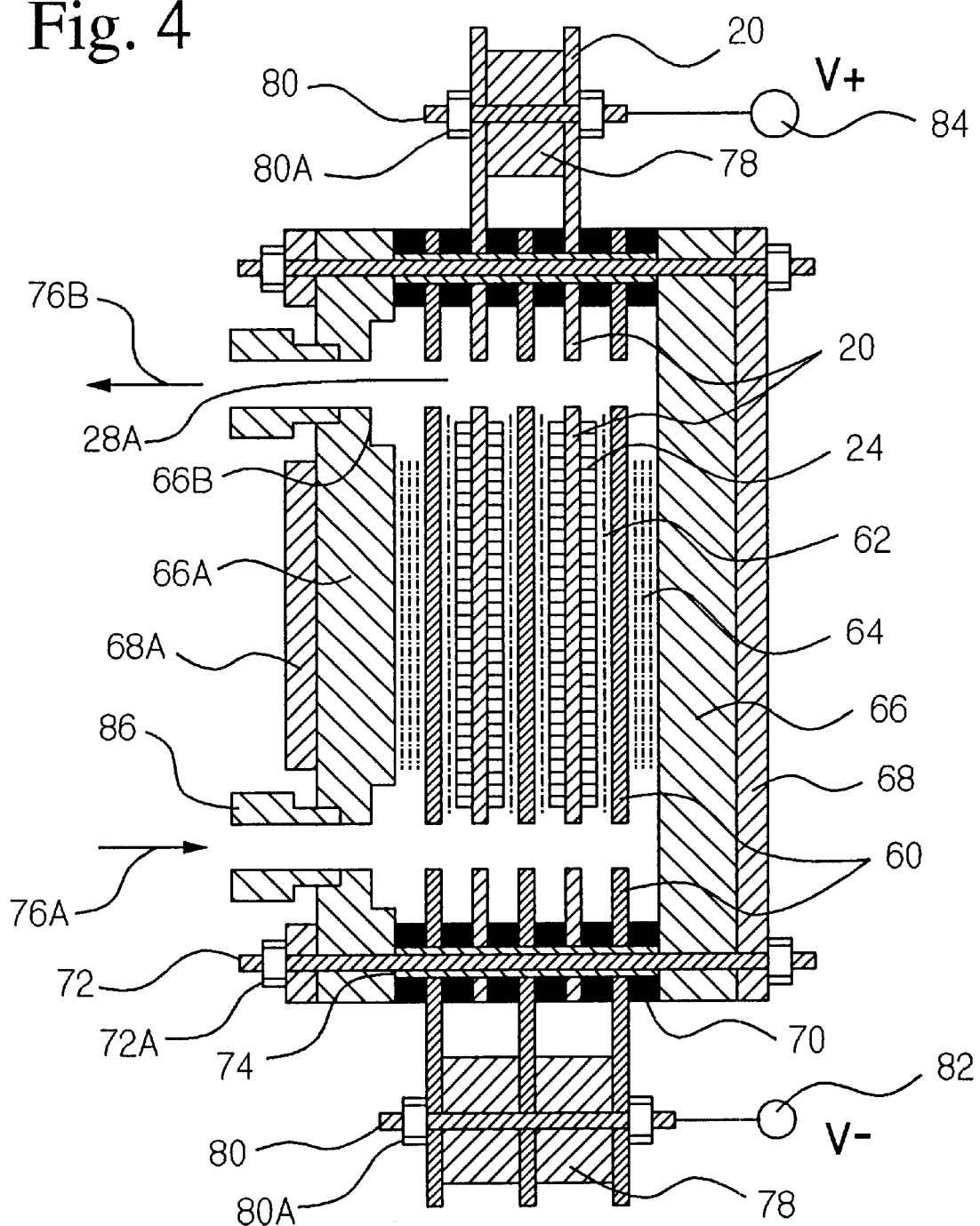

FIG. 4 shows an electrochemical cell that includes several electrodes of the kind illustrated in FIG. 2, serving as anodes. To make the figure legible, the cell is foreshortened in the vertical dimension, and the thickness of the electrode plates and other internal components is exaggerated. The anodes are as depicted in FIG. 2, comprising electrode plate 20, Ti-fiber tow 24 that has been wound on to it, and an electrocatalytic coating applied. They are installed in the cell in alternation with cathodes 60. Cathodes 60 have the same dimensions as the anode plates 20 shown in FIG. 2, the same flow holes 28, assembly bolt holes 30, and current collector bolt holes 32. However, they cannot be made of titanium which would warp and become brittle from hydriding if used as a cathode.

Contact of Ti-fiber 24 with cathode plates 60 is prevented by separating means 62 placed between the anodes and the cathodes. One or two layers of a plastic coated fiberglass mesh similar to that used for window screens but coarser (9 threads per inch or 3.5 threads per centimeter) may be used as the separating means. The spacing between adjacent anodes and cathodes is set by end gaskets 70, which also seal the ends of the cell assembly against water leakage. Ethylene-propylene rubber (EPR) is a suitable gasket material. The plastic back wall of the cell 66 and front wall 66A are backed by metal pressure plates 68 and 68A. The entire stack is pressed together using threaded rods 72 and nuts 72A. Threaded rods 72 are insulated using plastic tubing 74 which keeps threaded rod 72 from short-circuiting anode plates 20 with cathodes 60. Driven by an external pump or other electrolyte circulating means, the electrolyte flows into 76A and out of 76B the cell through plastic tube fittings 86. Flow holes 28 in anode plates 20 and cathode plates 60 define channels 28A permitting the electrolyte to flow in a direction perpendicular to anode plates 20 and cathode plates 60 inside the cell. The size and placement of flow holes 28 favor an even distribution of the flow between the electrodes inside the cell. Several layers of interlocking mesh are placed between the plastic outer wall 66 and the adjacent cathode 60 to prevent electrolyte from bypassing the electrodes.

As illustrated in FIG. 2, anode plates 20 and cathode plates 60 are not symmetrical. The end with current collector bolt holes 32 is longer than the other end. In the assembled cell shown in FIG. 4, the anodes are installed with the longer ends of anode plates 20 protruding from the upper part of the cell, and cathodes 60 are installed with the longer end protruding downwards. Current collectors 78, preferably made of solder plated copper, are bolted between anode plates 20 using threaded rods 80, which pass through current collector bolt holes 32, and nuts 80A, and the stack of anode plates 20 and current collectors 78 is connected to positive pole 84 of a power supply. Current collectors 78 are likewise bolted between the protruding ends of cathodes 60 which are connected to the negative pole 82 of the power supply.

Figure 5:
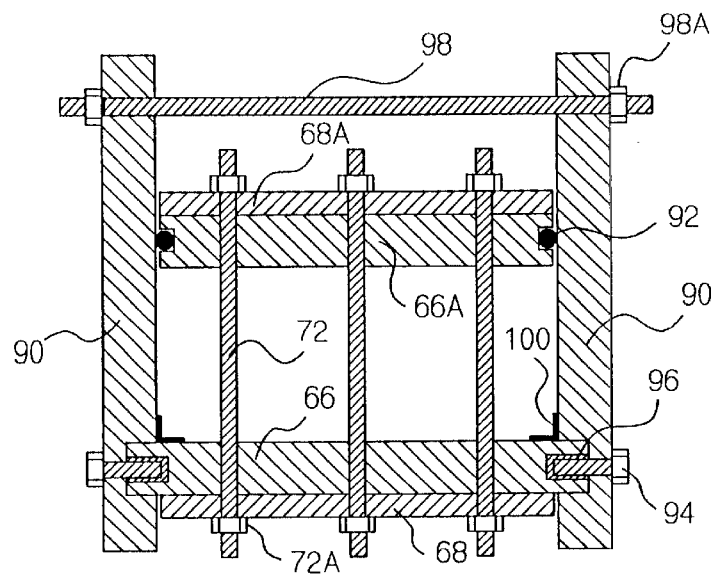

FIG. 5 illustrates a horizontal cross-section of the cell assembly. For clarity, the electrodes and layers of mesh inside the cell and the external tube fittings are not depicted in this drawing. As was shown in FIG. 4, back wall 66 and front wall 66A are backed by backing plates 68 and 68A and the whole assembly to held together by threaded rods 72 and nuts 72A. Plastic sidewalls 90 define the sides of the cell. Sidewalls 90 are attached to back wall 66 using bolts 94 and threaded inserts 96. Threaded rods 98 and nuts 98A press the front part of sidewalls 90 against the edges of front wall 66A, and O-ring cords 92, which sit in machined grooves along either edge of front wall 66A, provide a water-tight seal. The vinyl tape 100 is used to seal the joint between back wall 66 and side walls 90. Minor leaks that may occur at the corners of the cell assembly are sealed using an appropriate caulking compound or plumber's putty (not shown).

Figure 6:
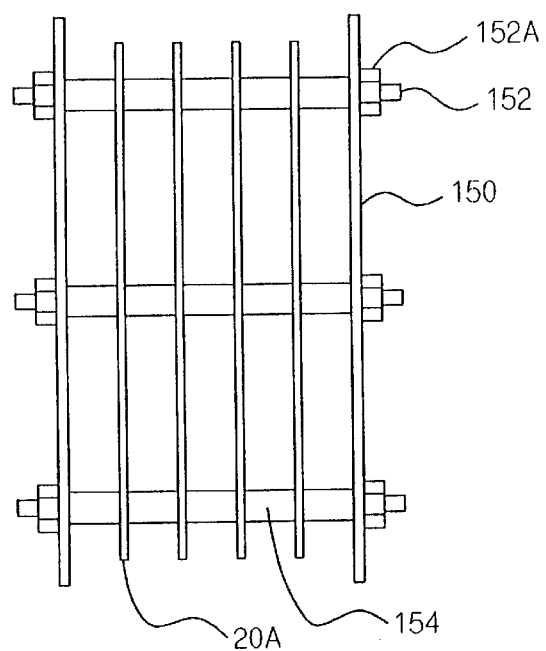

FIG. 6 shows a stack of anodes bolted together between two end plates in preparation for coating. Several anodes 20A (comprising Ti anode plates wound with Ti-fiber) are bolted together using Ti-threaded rods 152, Ti-nuts 152A, and Ti-spacers 154, allowing them to be coated as a unit. (The Ti-fiber 24 wound on electrode plates 20 is not shown in this Figure for clarity.) An end plate 150 made of heavier gauge Ti-sheet and larger than the electrodes plates is included at either end of the stack. End plates 150 keep the edges of electrodes 20A from resting on the floor of the furnace, etc., and effectively put each electrode "inside" the stack whereby they are all coated equally and uniformly. The spacers are conveniently made by cutting Ti-tubing into short pieces of uniform length (8–10 mm). Ti-threaded rods 152 pass through assembly bolt holes 30 in the anode plate.

DETAILED DESCRIPTION OF THE INVENTION

Improvements Needed Over Prior Art

In trying to improving upon the coating procedures described in U.S. Pat. No. 5,419,824 we discovered that annealing the electrodes under argon at 800° C. would reduce the niobium in the coat, probably due to diffusion of Ti-atoms from the Ti-metal substrate into the slurry coat. Eliminating the hydrogen anneal allowed plate electrodes to be produced, but fiber electrodes subjected to this high temperature anneal were still severely embrittled.

Eventually we hit upon using a "blue slurry" coating composition that would allow us to anneal at a lower temperature. Hydrous titanium dioxide slurry was washed and the appropriate amount of a water soluble niobium compound was added to it using a minimum amount of water. The resulting paste was dried and crushed, then baked under hydrogen above 800° C. to reduce most of the niobium to the +4 oxidation state. It is believed that some of the titanium was reduced to the +3 oxidation state as well. The resulting blue, semiconductive solid was then ground in a ball mill, washed, and dried to produce "blue powder." "Blue slurry" was made by mixing the blue powder with overcoating solution and water. Initially, the electrodes were dipped in blue slurry and baked in air at 400° C., but it was found that drying the electrodes under steam at 100–200° C., followed by baking under argon or carbon dioxide at 450° C. produced better electrodes. (Steaming removes organic residues.) Multiple coats of slurry and overcoat were applied in this way, producing a well-cemented electrode coating comprising semiconductive particles of "blue powder" bonded by a nonconductive cement comprising $TiO_2$ doped with $Nb^{+5}$. Finally, the electrodes were annealed under argon at 650° C. to render the coating fully semiconductive. It is believed that solid state diffusion reactions involving small amounts of $Ti^{+3}$ present in the blue powder reduce the Nb in the cement to the +4 oxidation state, producing an operable electrode. Decreasing the annealing temperature to 650° C. gave us fiber electrodes that were still noticeably brittle, but usable.

Finally we replaced Nb in the overcoat with Sb as the doping element. This change allowed the annealing temperature to be reduced to 450° C. under an atmosphere of $CO_2$, producing even less brittle coated fibers. The coating on these electrodes comprised semiconductive particles of $TiO_2$ doped with Nb in the +4 oxidation state imbedded in a semiconductive cement of $TiO_2$ doped with Sb, probably in the +3 oxidation state. We also tested an overcoat compounded using water soluble chelates of tin and antimony, whereby the cement comprised $SnO_2$ doped with Sb. The surprising and unexpected result was that electrodes prepared using a Ti/Sb or even a Sn/Sb overcoat performed just like electrodes prepared using a Ti/Nb overcoat. It is believed that the electrochemical properties of these electrodes are dominated by the particles of blue powder, making them practically indistinguishable from electrodes with a coating that contains titanium and niobium only.

A way to prevent electrode failure by passivation of the Ti-metal substrate was provided in U.S. Pat. Nos. 4,444,642 and 4,528,084 whereby a "precoat" comprising $IrO_2$ and $TiO_2$ was applied to the Ti-metal substrate prior to application of an electrocatalytic coating of a different kind. In U.S. Pat. No. 5,364,509 a mixture of $IrO_2$ and $Ta_2O_5$ was applied to the Ti-metal substrate before applying the final layer of Sb-doped $SnO_2$. We tested these precoats and others, applying them to the Ti-metal substrate, followed by the Nb-doped $TiO_2$ slurry coat described in U.S. Pat. No. 5,419,824. The electrodes so produced had good endurance, but poor current yield. This failure was not surprising. In U.S. Pat. No. 5,419,824 Weres and Hoffmann stated that Pt group metals should not be present in the electrode coating in catalytically significant amounts if the electrode is to be operable at a potential sufficiently positive to generate hydroxyl. It is believed that the slurry coat contained pores, fractures and holidays which effectively exposed the underlying Ir/Ta precoat to contact with the electrolyte. Most of the current flowed to and through the exposed precoat and was wasted generating oxygen bubbles. Little hydroxyl was produced, and the current efficiency of the electrode was small.

We thought that an intermediate "sealing coat" might act as a primer to improve adhesion of the slurry coat to the precoat. After screening various compositions, we found that a sealing coat comprising $SnO_2$ doped with Sb had the desired effect. Surprisingly, sealing coat prepared using the hydrated solid salt $SnCl_4 \cdot 5H_2O$ works much better than a sealing coat of the same chemical composition prepared using the anhydrous liquid $SnCl_4$.

With this three layer coating sequence, we finally achieved good endurance and good current yield. The pronounced synergistic effect of applying a layer of Sb-doped $SnO_2$ underneath the final layer of $TiO_2$ doped with $Nb^{+4}$ and Sb was surprising and unexpected. No reference suggested using Sb-doped $SnO_2$ as an intermediate layer for this or another purpose.

As noted in the review of prior art above, corrosion of the Ti-metal fiber when wetted with the precoating solution is undesirable because a large fraction of the thin fiber can corrode away, and large variations among fibers result when some but not all fibers are attacked. Also, at the low current density of interest in this application, a thick precoat is not needed. Finally, a precoating solution that corrodes Ti tends to spoil quickly, and spoilage gets expensive when iridium is being wasted. For these reasons, a thin precoat produced without corroding the Ti-metal fibers is preferable. Using $H_2IrCl_6$ instead of $IrCl_3$ as taught in prior art inhibits corrosion to some extent. By adding nitric acid to the precoating solution to more strongly passivate the surface of the Ti-fibers, we more thoroughly inhibited corrosion, producing a thin, uniform coating comprising a mixture of $IrO_2$ and $Ta_2O_5$. Improved electrodes resulted, and used precoating solution compounded with nitric acid doesn't spoil. In some applications, instead of serving as a precoat, the improved coating of $IrO_2$ and $Ta_2O_5$ produced by adding nitric acid to the coating solution may serve as the sole or final layer of a coating sequence, thereby improving upon U.S. Pat. No. 3,878,083.

DETAILED DESCRIPTION OF THE INVENTION

Preferred Embodiment
The Cell Assembly.

In the preferred embodiment, electrode plate 20 is nominally pure titanium (Ti-Gr.1 or Ti-Gr.2) 0.02 inches (0.5 mm) thick, and measures 8×18 inches (203×457 mm). Cathode 60 is made of a corrosion resistant alloy selected for the application; for example, 316 stainless steel (approximately Fe—17Cr—12Ni—2.5Mo—0.08C—1Si—2Mn), Ni—2.5Co—15.5Cr—16Mo—3.8W—5.5Fe (Hastelloy C—276) or Ni—2.5Co—22Cr—13Mo—3W—3Fe (Hastelloy C—22). Hastelloy cathodes are preferred if chloride is present in the electrolyte. Cathode 60 is approximately 0.025 inches (0.64 mm) thick. The hardware used to assemble the cell (threaded rods, bolts, nuts, threaded inserts, etc.) is stainless steel.

The outer walls and side walls of the cell are made of 0.5 inch (12.7 mm) polypropylene. The backing plates are 0.25 inch (6.35 mm) aluminum plate.

Ti-fiber and Winding Procedure.

In the preferred embodiment of the invention, the titanium fiber is a 200 count tow of Ti-fibers with a nominal diameter of 25 micrometers; that is, the fibers do not have a circular cross-section, but the cross-sectional area of each fiber equals a circle of 25 μm diameter. The material is nominally pure Ti, preferably Ti-Gr.1. The detailed coating procedure below is described in application to this tow, and the number of coating cycles, slurry concentration etc., might need to be adjusted if a different tow is used. Similarly, gas and water flow rates are sized for a 40 liter furnace chamber.

The tow is conveniently produced using the composite drawing method provided in U.S. Pat. No. 3,394,213.

Ti-fiber tow of this kind is commercially available in the United States and in Europe. The Ti-fiber tow is wound on electrode plate 20 with a pitch of 20 per inch or 1.27 mm; a different pitch may be needed to provide a smooth layer of fiber if Ti-fiber tow of a different fiber count or diameter is used.

The width and thickness of mounting plates 40A and 40B and the tension setting of tensioner 52 together determine the tension of the Ti-fiber tow after it has been wound on to electrode plate 20. In practice, one must take care that the Ti-fiber is not wound too tightly. If the Ti-fiber is too tight, it will bow the electrode plate 20 after the mounting plates 40A and 40B are withdrawn. Removing mounting plates 40A and 40B provides slack to the Ti-fiber, and the amount of slack increases with both the thickness and the width of the mounting plates. When winding electrodes 8 inches (203 mm) wide, mounting plates made of $3/32$ inch (2.4 mm) aluminum sheet with a width of 6 inches (152 mm) give good results with the tensioner set at about 35 ounces force (10 newtons).

Coating Procedures Employed and Electrodes Produced

The electrodes are mounted in a rack as shown in FIG. 6, and coated employing the procedure presented below. The quality of the electrodes produced is quite sensitive to the pH, concentration, etc., of the slurry coating composition ("Blue Slurry") and the overcoating solution. The Blue Slurry and the overcoating solution should be prepared just before use.

The performance characteristics of newly coated anodes improves over the first few days of operation. New anodes may be "broken in" by operating for 2 to 4 days in 0.1N NaCl at the "design" current density of 25 mA cm$^{-2}$ referred to the surface area of the anode plate covered with the Ti-fiber.

Numerous electrodes of various sizes have been produced using this procedure with current yield ranging 20–50% and apparent surface concentration of hydroxyl ranging 1 to $2 \times 10^{-16}$ mole cm$^{-2}$. (The latter parameter dominates the kinetics of the oxidation process at low reactant concentration.) The electrodes were tested by oxidizing diethyleneglycolmonobutyl ether in 0.04N NaCl while monitoring decrease in COD to determine current yield, and by determining the starting compound by gas chromatography to determine the surface concentration of hydroxyl. These electrodes can be operated for several weeks at 100MA cm$^{-2}$ (that is, 4 times design current density) before decreasing current yield is noted.

Equipment Needed for Coating

1. A drying chamber, where the electrodes can be exposed to a constant stream of air at about 90° C. to dry them. Provide a wet scrubber to collect any acid vapors that may be generated before they are released to the atmosphere.

2. A thermostated steaming chamber able to maintain 200° C. temperature with provision for a controlled flow of liquid water into the chamber to generate steam. The steaming chamber should be equipped with an internal fan to vigorously circulate the atmosphere inside, means for introducing a purge stream of CO$_2$ or air, and a condenser to condense the steam flowing out of the chamber.

3. A thermostated furnace able to maintain 450° C. temperature with provision for a controlled flow of liquid water into the chamber to generate steam. The steaming chamber should be equipped with an internal fan to vigorously circulate the atmosphere inside, means for introducing a purge stream of CO$_2$ or argon (useful for fire suppression), and a condenser to condense the steam flowing out of the furnace.

Application of Precoat

Use "Precoating Solution 70 Ir—30 Ta/3N HCl" described below.

Dip the anodes into precoating solution and let excess drain.

Dry in the drying chamber.

Bake in the furnace in air at 400° C. for 5 minutes measuring time from when furnace temperature reaches 400° C. after inserting stack of electrodes and closing the door.

Repeat the steps above for a total of four cycles.

Application of Sealing Coat

Use "Sealing Coat Solution 96 Sn—4 Sb/3N HCl" described below

Dip the anodes into sealing coat solution and let excess drain.

Dry in the drying chamber.

Repeat the steps above for a total of four cycles.

Bake in air at 400° C. for 10 minutes, measuring time from when furnace temperature reaches 400° C. after inserting stack of electrodes and closing the door.

Remove from furnace and cool to room temperature using a fan.

The fiber may come out of the seal coating procedure somewhat stuck together. For the best results, after cooling disassemble the stack and rub Ti-fibers gently with your fingers to loosen them, then reassemble the stack for slurry coating.

The coating procedure comprises application of multiple layers of slurry coat and overcoat. Good anodes are produced by the coating sequence 3×(3×S,O); that is, three slurry coats followed by one overcoat, with the entire sequence repeated a total of three times.

Application of Slurry Coat and the Overcoat

Use "Blue Slurry Coating Composition BS TiSb4" described below.

Stir the slurry to make it uniform.

Set steaming chamber temperature to 200° C.

Dip anodes in the slurry.

Place anodes in the steaming chamber.

Turn on water flow into steaming chamber at 24 mL/min, and steam 40 minutes or as long as needed to completely dry the anodes.

Remove electrodes from steaming chamber and immediately dip them in water. (The thermal shock counteracts cementation of the fibers.)

Set furnace temperature to 450° C.

Set inert gas (Ar or CO$_2$) flow into furnace at 3L/min.

Place electrodes in furnace for 40 minutes, measuring time from when furnace temperature reaches 450° C. after inserting stack of electrodes and closing the door. Gas flow should be reduced to 1L/min after the door has been closed and temperature starts to climb.

Remove electrodes and cool rapidly using a fan.

The overcoat is applied exactly like the slurry coat, using the procedure described above with "Overcoat Solution TiSb4" in place of the "Blue Slurry Coating Composition."

Composition of Coating Solutions

The composition of Precoating Solution 70 Ir-30 Ta/3N HCl is:

3N HCl 13.1 mM TaCl$_5$ 30.6 mM H$_2$IrCl$_6$ 0.3N HNO$_3$ 2 g/L nonionic wetting agent, preferably polyoxyethylene (10) isooctylphenyl ether Deionized water as needed to make up the final volume.

Dissolve the TaCl$_5$ in the appropriate volume of 12N HCl, add part of the deionized water, add the H$_2$IrCl$_6$ solution, add the nitric acid and the wetting agent, and finally make up to the final volume with deionized water.

The composition of Seal Coating Solution 96 Sn—4 Sb/3N HCl is:

3N HCl 0.24M SnCl$_4$.5H$_2$O 0.01M SbCl$_3$ 2 g/L nonionic wetting agent, preferably polyoxyethylene (10) isooctylphenyl ether 1 mL/L of a silicone antifoaming agent which contains 10% polydimethylsiloxane Deionized water as needed to make up the final volume.

First dissolve the appropriate amount of antimony trioxide (Sb$_2$O$_3$) in concentrated HCl to produce the solution of SbCl$_3$. Then add part of the deionized water, add the solid SnCl$_4$.5H$_2$O and stir to dissolve it, add the wetting agent and antifoaming agent, and make up to the desired volume with deionized water.

The composition of Overcoating Solution TiSb4 is:

0.24M TiGlycolate (mole ratio 1:1.33)

0.01M Sb Tartrate (mole ratio 1:1.25)

1.8 g/L nonionic wetting agent, preferably polyoxyethylene (10) isooctylphenyl ether 1 mL/L of a silicone antifoaming agent which contains 10% polydimethylsiloxane Deionized water as needed to make up the final volume.

The source of Sb is a 0.1M antimony tartrate solution made by dissolving 0.1 mole of antimony triacetate (which is commercially available) in 1L of 0.125M tartaric acid. The source of Ti a solution that we call "TiGlycolate(4/3)" prepared as described below, which contains the chemical components TiO$_2$ and glycolic acid in the mole ratio 1:1.33. This is approximately the lowest GA:Ti mole ratio to give a product that won't gel. Ti glycolate has the advantage over other water soluble Ti-chelates in that the glycolic acid represents relatively little COD, and is readily removed from the electrodes by exposing them to steam, whereby formation of char during the coating process is largely avoided. The actual concentration of Ti present in this solution will vary from batch-to-batch, and the actual amount used to prepare the overcoating solution needs to be adjusted to give 0.24M Ti in the overcoating solution.

Add the antimony tartrate solution to a portion of the deionized water, add the required amount of TiGlycolate(4/3), and stir to dissolve. Add the wetting agent and the antifoaming agent, and make up to final volume with deionized water. Adjust the pH of the overcoating solution to 3.2 using ammonium hydroxide, and sonicate until clear.

The composition of the Blue Slurry Coating Composition BS TiSb4 is:

33 volume % Overcoating Solution TiSb4 prepared as described above 80 g/L Blue Powder (prepared as described below)

3.3 g/L nonionic wetting agent, preferably polyoxyethylene (10) isooctylphenyl ether 1.3 mL/L of a silicone antifoaming agent which contains 10% polydimethylsiloxane Deionized water as needed to make up the final volume.

The amounts of wetting agent and antifoaming agent specified above are in addition to the amounts introduced with the overcoating solution. Mix the overcoating solution with part of the deionized water, add the wetting agent and the antifoaming agent, add the Blue Powder and mix until well dispersed, then make up to the final volume with deionized water.

Preparation of Chemical Materials Not Commercially Available.

Blue Powder

The "Blue Powder" is a finely ground TiO$_2$ powder doped with 4 mole % Nb in the +4 oxidation state. Blue Powder is made starting with white anatase slurry, which is the precursor of titanium dioxide pigments made by the sulfate process and is commercially available. White anatase slurry is made by precipitating hydrous titanium dioxide from titanyl sulfate solution by heating it. The white anatase slurry has been washed to remove most of the sulfuric acid, but it has never been dried and certainly not calcined. Some sulfuric acid is allowed to remain in the commercial product to stabilize it against gelling. The recipe below is directly applicable to a starting material that contains titanium equivalent to about 26 weight percent TiO$_2$, and 2–4 weight percent sulfuric acid. A high purity commercial material that contains less than 50 mg/kg of iron oxide is preferred. Our procedure for making the Blue Powder starts with a washing procedure to remove additional sulfuric acid.

1. Pour 5 gallons (19L) white anatase slurry into a 15 gallon (57L) plastic drum.
2. Add water to make about 13 gallons (50L) total volume and stir to disperse the slurry.
3. Let settle several hours then siphon off the supernatant water.
4. Repeat steps 1 through 3 two more times.
5. After third wash, refill and stir then let settle at least 12 hours.
6. Siphon off water and repeat step 5 one more time.
7. After completing step 6, pour into a five gallon (19L) tightly covered plastic bucket for storage. Let stand for at least one week.
8. Prior to using the washed slurry siphon off the supernatant water. The washed slurry should now contain 30–40 weight percent solids. 9. When ready to make fresh Blue Powder, siphon off supernatant water from the 5 gallon (19L) bucket then mix remaining slurry well.
10. Determine the solid content of the washed slurry by performing a gravimetric analysis (wherein the slurry is weighed, dried, and fired to orange heat in a crucible, and then weighed again after cooling) and calculate the weight of washed slurry needed to make the amount of Blue Powder desired.
11. To the washed white slurry add the amount of TMA Niobate Solution (prepared as described below) needed to introduce 4 mole percent Nb (relative to total Ti+Nb).
12. After mixing well, place in drying oven at about 90–95° C. until dry.
13. Grind until powder is visibly uniform.
14. Place the Nb-doped white powder into a four inch (10 cm) diameter tube furnace with a quartz glass or stainless steel tube and purge with He or Ar to remove O$_2$. Run exhaust gas through a bubbler containing 1N HCl to trap amine vapors released.
15. Set the temperature controller to 830° C. and turn on the heat.
16. Replace the inert gas purge with H$_2$ and monitor until the gas coming out of the furnace can be ignited.
17. For a 0.5 kg load of the Nb-doped white powder, heat under hydrogen at 830° C. for 90 minutes.
18. Turn off the power and let furnace cool to less than 500° C. then shift to either argon or helium for the rest of the cool down.
19. Once temperature is below 200° C., the furnace may be opened and the powder removed.
20. Place powder in a rubber lined 1 gallon (3.8L) ball mill jar with ¼ inch (6.35 mm) alumina grinding balls.

21. Add 1.5 g antifoaming agent (same kind as used in the coating recipes) and 0.15 mL of wetting agent per 100 gm of the calcined powder, which should now be a dark blue-grey.
22. Add filtered water to about ⅔ of the total volume of mill jar.
23. Grind for 48 hours. 24. After grinding is complete, strain out the alumina balls and rinse well to remove powder stuck to the balls.
25. Let ground powder and water settle for about 4 hours then siphon off supernatant water.
26. Place decanted slurry into drying oven at about 90 to 95° C. and let dry.
27. Grind dried powder in a coffee grinder.
28. Store the dried Blue Powder in an air-tight container.

The Blue Powder may also be doped using ammonium niobate prepared as described in U.S. Pat. No. 5,419,824. Indeed, Blue Powder prepared using ammonium niobate seems to give slightly better electrodes, but ammonium niobate is rather harder to produce than TMA niobate.

Procedure for Making "TiGlycolate(4/3)"

This recipe will produce a batch containing 1.92 moles of Ti.
1. Dilute 0.484L of titanium tetrachloride solution containing 21.5 weight percent $TiO_2$ and 38.5 weight percent HCl in about 4L of filtered water.
2. Place 7 pounds (3.2 kg) of ice into a 5 gallon (19L) plastic bucket.
3. Mix 0.52 L of conc. $NH_4OH$ with about 1 L of water and pour it over the ice.
4. While stirring, slowly pour the solution of titanium tetrachloride into the bucket.
5. Adjust the pH to about 6 using HCl or $NH_4OH$ as needed.
6. Wash the precipitate by adding filtered water nearly to top of bucket and mixing, allowing precipitate to settle, then siphoning the supernatant water. Repeat this washing procedure a total of three times.
7. Centrifuge settled precipitate to dewater (700 to 1,000 g).
8. Combine washed precipitate with 0.222 L of 70 weight percent glycolic acid in an appropriate container, then put into a hot water bath at 75° C. until translucent (2–3 days).
9. Stir solution and allow to cool before using.

The pH of the mixture in step 4 should be in the range 5.5 to 7.0. Depending on the exact compositions of the solutions, it may be necessary to adjust the volumes used to provide the amount of Ti required by the recipe (1.92 g-moles) and give the pH desired.

Procedure for Making "TMA Niobate"

This recipe will produce a batch of "TMA Niobate" containing 0.200 g-mole Nb and 0.200 g-moles of tetramethylammonium hydroxide.
1. Mix 26.85 g $Nb_2O_5$ with 84.42 g of $K_2SO_4$ and put mixture into a 250 mL low form porcelain crucible or evaporating dish.
2. Under fume hood, add 43.6 g conc. $H_2SO_4$ and stir to mix.
3. Preheat box furnace to 650° C. inside of exhaust hood.
4. Place crucibles into furnace for 15 minutes.
5. Half-fill a 1.2L blender with filtered water and set it to high speed.
6. Using crucible tongs, carefully remove crucible from the furnace, and slowly pour molten material into the water in the running blender.
7. Pour contents of the blender into a 1 gallon (3.8L) plastic pitcher, rinse blender and pour rinse water into the pitcher.
8. Fill bucket with filtered water, mix, allow precipitate to settle for a few hours, and carefully pour off supernatant water. Repeat this washing cycle two more times.
9. Centrifuge precipitate to dewater.
10. Combine precipitate with add 72 mL of 25 weight percent $N(CH_3)_4OH$ in a plastic bottle and heat in hot water bath at about 90° C. until clear.

Conclusions and Ramifications

Although the description above contains many specificities, these should not be construed as limiting the scope of the invention but merely as providing examples of some of the presently preferred embodiments. Thus the scope of the invention should be determined by the appended claims and their legal equivalents, rather than by the examples given.

The electrode coating sequence described herein may be applied to a Ti-metal substrate of any convenient geometry; for example, plates, woven mesh, expanded mesh, fiber, rod, wire, or a combination thereof. Other valve metals may be used as the material of the fiber tow or the support member; for example, Zr, Nb or Ta. Alloys of Ti or the other valve metals may also be used. The composition of the support member may be different from the composition of the tow, and the support member may be coated differently, or not at all.

By "disposed in a wound manner," we mean that the fiber tow comprising part of the completed electrode looks like it was wound on to the plate, whether-or-not it actually was wound on to the plate; for example, the fiber tow might actually have been wound on an appropriate temporary support member, coated, and subsequently transferred to the plate with winding geometry preserved. While a single winding layer of tow, tightly spaced, is described in the preferred embodiment, a more loosely spaced wind or multiple winding layers may also be used. Different fiber counts and fiber diameters can be used. A fine Ti-wire or multiplicity of wires can serve as the Ti-fiber instead of a Ti-fiber tow comprising many fine fibers.

By "electrocatalytic coating," we mean the entire multi-layer sequence applied to the Ti-metal substrate. While our preferred embodiment includes a slurry layer comprising $TiO_2$ doped with Nb in the +4 oxidation state and Sb, an outermost layer of another composition may be applied; for example, some other metal oxide composition that will produce hydroxyl free radical and oxidize substances dissolved in the electrolyte when a sufficiently large positive potential is applied to the electrode. The two layer coating sequence taught in U.S. Pat. No. 5,364,509 may be used. While Sb is preferred as the doping element for $SnO_2$, other doping elements recommended for this purpose in U.S. Pat. No. 4,839,007 may optionally be used to make the $SnO_2$ usefully conductive. Doping elements may be used in combination.

By "coating composition" we mean either a solution or a slurry. The slurry coat may be cemented with Sb-doped $SnO_2$ in place of Sb-doped $TiO_2$ In this case, the overcoating solution SnSb-4 is prepared using tin glycolate in place of titanium glycolate. The tin glycolate solution may be prepared exactly as described above for "TiGlycolate(4/3)", but starting with a solution of tin tetrachloride in water in place of titanium tetrachloride. The "Blue Slurry Coating Composition SnSb-4" is then prepared using the SnSb-4 overcoat in place of the TiSb-4 overcoat. The slurry coat may be cemented using $TiO_2$ doped with Nb in the +4 oxidation state. In this case, Nb oxalate replaces Sb tartrate in the overcoating solution and the Blue Slurry. Niobium oxalate is prepared in the same manner as TMA niobate; at the last step, add oxalic acid (two moles per mole of Nb) instead of TMA hydroxide. After the electrodes are fully coated, anneal them under argon for at least one hour at 650° C. to effect reduction of the Nb to the +4 oxidation state. Ta may also be used as the doping element in place of Nb. To dope the Blue Powder with Ta in place of Nb, use TMA tantalate in place of TMA niobate. To make TMA tantalate, dissolve tantalum pentachloride in 12N HCl, dilute the solution, adjust pH to 7 with ammonium hydroxide, centrifuge and wash the precipitate, and dissolve using TMA hydroxide. The cement can also be doped with Ta. Make overcoating solution using Ti glycolate and Ta oxalate instead of Sb tartrate or Nb oxalate. Make Ta oxalate following the procedure for TMA tantalate, substituting oxalic acid for TMA hydroxide at the last step. (The precipitate is slow to dissolve.)

In the preferred embodiment, nitric acid is added to the precoating solution. However, another passivating additive may be added in a concentration sufficient to inhibit corrosion of the Ti-fiber in the precoating solution; for example, salts of molybdate, perchlorate, chlorate, dichromate, manganate, iodate or vanadate, or salts of $Ce^{+4}$.

In the preferred embodiment, the valve metal substrate of the electrode comprises Ti-metal fiber wound on to a rectangular Ti-metal plate, and the resulting electrodes serve as anodes. Electrodes with substantially planar geometry are preferred, because they may be disposed in a substantially parallel relation, preferably by being assembled in a stack in alternating sequence with planar counterelectrodes. A rectangular frame made of titanium metal strips may also be used as the supporting member, or another design. Optionally, the Ti-fiber tow may be coated in a continuous process or while temporarily wound on a corrosion resistant temporary support member, then wound on to a coated Ti plate.

A cathode or battery plaque of the same geometry can be made using a metal suited to the particular application; for example, by winding stainless steel fiber tow on to a stainless steel plate, or nickel fiber tow on to a nickel plate, or even carbon steel tow on a steel plate. Various electrocatalytic coatings may be applied; for example, nickel or copper applied by electroplating, electroless plating or other appropriate means.

What is claimed is:

1. An electrode comprising
    a valve metal substrate,
    a protective precoat layer containing at least one substance selected from the class consisting of the platinum group metals and the oxides of platinum group metals, and
    an outermost semiconductive metal oxide layer,
    wherein the improvement consists of further providing an intermediate layer with a composition selected to decrease leakage of current from an electrolyte solution in contact with said electrode directly to said protective precoat layer when said electrode is anodically polarized,
    whereby said electrode is able to more efficiently oxidize organic substances dissolved in said electrolyte solution; for example, diethyleneglycolmonobutylether.

2. The electrode of claim 1, wherein said outermost semiconductive metal oxide layer comprises predominantly titanium dioxide.

3. The electrode of claim 2 wherein said outermost semiconductive metal oxide layer comprises titanium dioxide doped with one or more additive metals selected from the group consisting of niobium in the +4 valence state, tantalum in the +4 valence state, and antimony.

4. The electrode of claim 3, wherein said intermediate layer comprises predominantly tin dioxide.

5. The electrode of claim 4, wherein said intermediate layer comprises tin dioxide doped with antimony.

6. The electrode of claim 4, wherein said protective precoat layer contains a substance selected from the class consisting of iridium and iridium oxide.

7. The electrode of claim 6, wherein said protective precoat comprises iridium dioxide and tantalum pentoxide.

8. The electrode of claim 3, wherein said valve metal is selected from the class consisting of titanium and titanium alloys.

9. The electrode of claim 3, wherein said outermost metal oxide layer comprises
    particles of titanium dioxide and a cement binding said particles, wherein
    said particles of titanium dioxide are doped with a doping element selected from the class consisting of niobium in the +4 oxidation state and tantalum in the +4 oxidation state.

10. The electrode of claim 9, wherein said cement comprises titanium dioxide doped with a doping element selected from the class consisting of antimony, niobium in the +4 oxidation state, and tantalum in the +4 oxidation state.

11. The electrode of claim 9, wherein said cement comprises tin dioxide containing at least one doping element.

12. The electrode of claim 11, wherein said doping element is antimony.

* * * * *